United States Patent
Leimann et al.

(10) Patent No.: US 8,578,806 B2
(45) Date of Patent: *Nov. 12, 2013

(54) PARALLEL GEAR UNIT FOR A GEARBOX FOR A WIND TURBINE

(75) Inventors: Dirk-Olaf Leimann, Edegem (BE); Erwin Van Eyndhoven, Aartselaar (BE)

(73) Assignee: Hansen Transmissions International N.V., Kontich (BE)

( * ) Notice: Subject to any disclaimer, the term of this patent is extended or adjusted under 35 U.S.C. 154(b) by 333 days.

This patent is subject to a terminal disclaimer.

(21) Appl. No.: 12/849,101

(22) Filed: Aug. 3, 2010

(65) Prior Publication Data

US 2011/0033299 A1 Feb. 10, 2011

(30) Foreign Application Priority Data

Aug. 10, 2009 (EP) .................................. 09447040

(51) Int. Cl.
*F16H 1/12* (2006.01)

(52) U.S. Cl.
USPC ........................................................ 74/421 R

(58) Field of Classification Search
USPC ................................. 74/414, 421 R
See application file for complete search history.

(56) References Cited

U.S. PATENT DOCUMENTS

| | | | |
|---|---|---|---|
| 1,499,617 A * | 7/1924 | Kasley ............................ | 74/410 |
| 1,759,689 A * | 5/1930 | Day ................................ | 74/410 |
| 2,734,396 A * | 2/1956 | Falk et al. ..................... | 74/665 B |
| 2,952,165 A * | 9/1960 | Bade ............................. | 74/606 R |
| 3,029,661 A * | 4/1962 | Schmitter ..................... | 74/606 R |
| 3,398,597 A * | 8/1968 | Chung .......................... | 74/421 R |
| 4,312,244 A * | 1/1982 | Barnes et al. .................. | 74/410 |
| 4,369,668 A * | 1/1983 | Pollak-Banda et al. ........ | 74/414 |
| 4,429,586 A * | 2/1984 | Dopfer et al. .................. | 74/410 |
| 4,452,547 A * | 6/1984 | Thiel et al. .................... | 403/370 |
| 4,709,590 A * | 12/1987 | Richards ........................ | 74/331 |
| 4,743,174 A | 5/1988 | Sato | |
| 5,126,609 A | 6/1992 | Shimono et al. | |
| 6,666,103 B2 * | 12/2003 | Gotoh .......................... | 74/412 R |
| 7,669,494 B2 * | 3/2010 | Bader ............................ | 74/331 |
| 2006/0055174 A1 | 3/2006 | Landwehr | |
| 2011/0030491 A1* | 2/2011 | Leimann et al. ................ | 74/413 |

FOREIGN PATENT DOCUMENTS

| | | |
|---|---|---|
| DE | 41 02 932 | 1/1992 |
| DE | 94 08 568 | 8/1994 |
| JP | 2009-144532 | 7/2009 |

OTHER PUBLICATIONS

European Search Report dated Dec. 15, 2009, from corresponding European application.

\* cited by examiner

*Primary Examiner* — Dirk Wright
(74) *Attorney, Agent, or Firm* — Young & Thompson (57) ABSTRACT

A parallel gear unit (20) for a gearbox (30) for a wind turbine includes at least a low speed shaft (21) and a high speed shaft (22), each shaft (21, 22) having a gear (23, 25) with helical teeth, the gears (23, 25) of each shaft (21, 22) being adapted for meshing with each other. The low speed shaft (21) is rotatably supported by roller bearings (24a) and the high speed shaft (22) is rotatably supported by sliding bearings (24b). A gearbox (30) including the parallel gear unit (20) and a wind turbine including such a gearbox (30) are described.

7 Claims, 8 Drawing Sheets

PARALLEL GEAR UNIT FOR A GEARBOX FOR A WIND TURBINE

TECHNICAL FIELD OF THE INVENTION

The present invention relates to a parallel gear unit for a gearbox for a wind turbine, and more particularly for a multi-megawatt wind turbine. The present invention also provides a gearbox comprising such parallel gear unit and a multi-megawatt wind turbine comprising a gearbox comprising such parallel gear unit.

BACKGROUND OF THE INVENTION

As wind energy business becomes more and more important, gearbox concepts are thoroughly studied nowadays. Known concepts of gearboxes for wind turbines may comprise at least one planetary gear unit and a parallel gear unit for connecting the planetary gear unit to the generator of the wind turbine.

Figure 1:
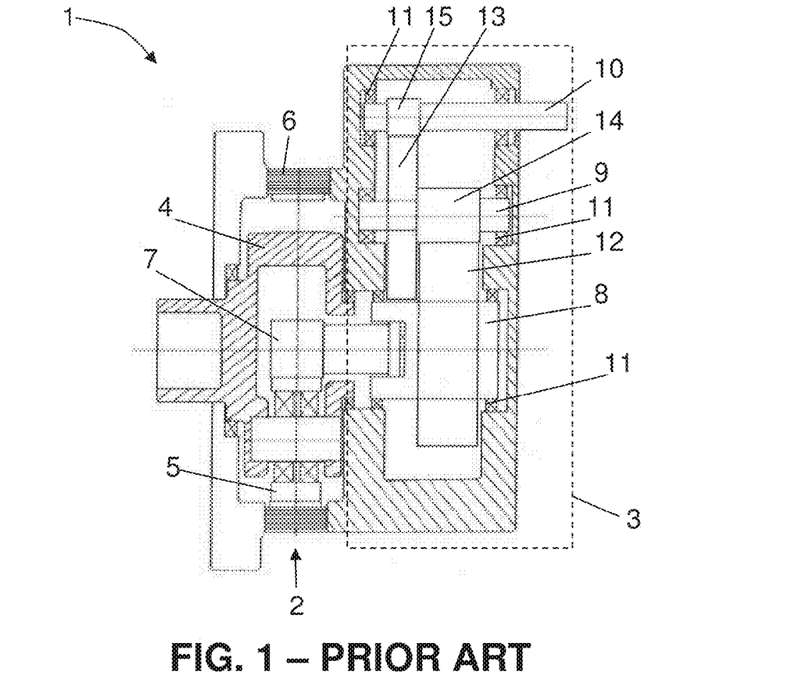
FIG. 1 to FIG. 3 illustrate gearbox concepts according to the prior art.
Figure 2:
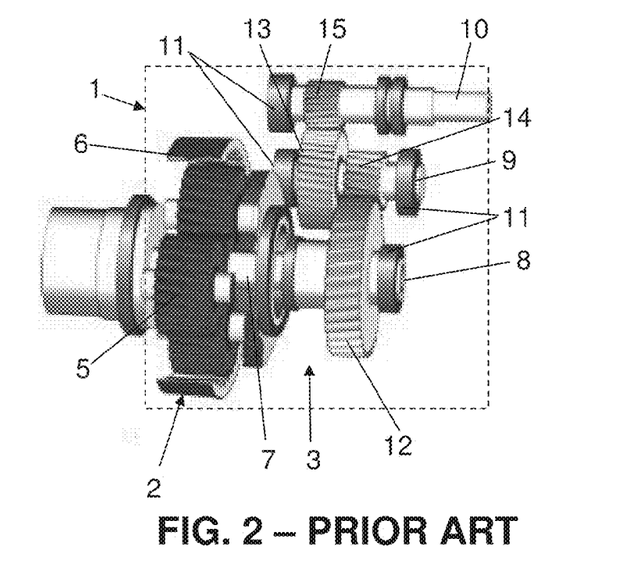

FIG. 1 and FIG. 2 schematically illustrate a type of gearbox 1 for a wind turbine according to the prior art. In this example, the gearbox 1 comprises one planetary gear unit 2 and a two-stage parallel gear unit 3. The planetary gear unit 2 comprises a planet carrier 4 which supports a plurality of planet gears 5. The planetary gear unit 2 furthermore comprises a ring gear 6 and a sun gear 7. In the example given in FIG. 1 and FIG. 2 the two-stage parallel gear unit 3 comprises a low speed shaft 8, an intermediate shaft 9 and a high speed shaft 10, which are all parallel to each other and which are each rotatably supported by bearings 11. The parallel gear unit 3 furthermore comprises two gears 12, 13. The gears 12, 13 respectively mesh with pinion 14 on the intermediate shaft 9 and pinion 15 on the high speed shaft 10.

Figure 3:
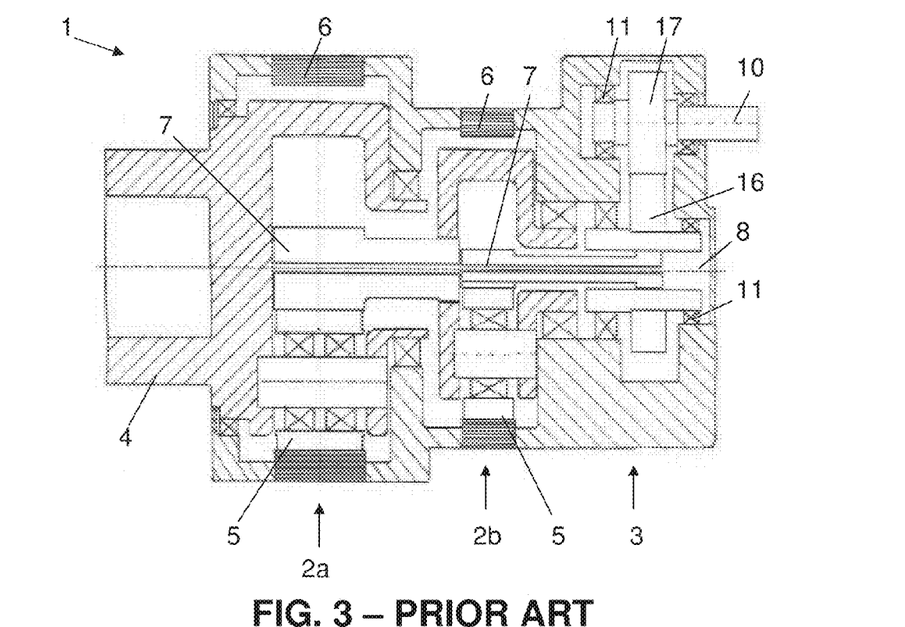

According to other known concepts, gearboxes 1 for wind turbines may comprise two planetary gear units 2 and a one-stage parallel gear unit 3. This is illustrated in FIG. 3. In the example given in FIG. 3, the gearbox 1 comprises a first planetary gear unit 2a, a second planetary gear unit 2b and a one-stage parallel gear unit 3. Each of the planetary gear units 2a, 2b comprises a planet carrier 4 which supports a plurality of planet gears 5, a ring gear 6 and a sun gear 7. The parallel gear unit 3 of the present example differs from the example shown in FIG. 1 and FIG. 2 in that it only comprises a low speed shaft 8 and a high speed shaft 10, and no intermediate shaft 9. The low speed shaft 8 and the high speed shaft 10 are rotatably supported by bearings 11. In this example, the parallel gear unit 3 comprises one gear 16 which is carried on the low speed shaft 8 and the high speed shaft 10 and which meshes with pinion 17 on the high speed shaft 10.

During operation of the wind turbine, loads acting on shafts and planets and forces originating at tooth contacts are created in the gearbox 1. Uptake of such loads and forces in gearboxes is currently done by using roller bearings. Such bearings are provided at, for example, the high speed shaft of the parallel gear unit 3 of the gearbox 1 and have to take up loads originating from the gearing.

Because noise behaviour is an important parameter in the design of wind turbine gearboxes and especially in multi-megawatt wind turbine gearboxes, gears in the parallel gear unit 3 are normally provided with a helical toothing with a big helix angle. However, because of this big helix angle radial and high axial forces are created which are to be uptaken by the bearings provided on the shafts.

Bearing arrangements of e.g. high speed shafts in parallel gear units can be designed as located or as a combination of located and non-located bearing arrangements. However, there is at least one bearing that takes axial load or a combination of axial and radial loads.

During operation, wind turbines, and especially multi-megawatt wind turbines, create high dynamic forces to and speed variations in the gearbox 1. Because of that, loads and speeds during operation of the gearbox 1 can differ from the design loads and speeds, i.e. from the predicted loads and speeds during design of the gearbox 1, and even reverse loads can occur.

However, for multi-megawatt wind turbines, roller bearings 11 which are available on the market may not be able to take up combined loads from axial forces and radial forces any more. Especially the axial forces can be critical on the roller bearings 11. This dynamic behaviour can lead to bearing damages and consequently to bearing failures.

Equivalent dynamic bearing load is determined by:

$$P \approx x \cdot F_r + y \cdot F_a \qquad (1)$$

wherein $F_r$ is the actual radial bearing load, $F_a$ the actual axial bearing load, x the radial load factor for the bearing and y the axial load factor for the bearing. The factors x and y depend on the type of bearings used. In case of, for example, a taper roller bearing x may be 0.4 and y may be between 1.3 and 1.6, which illustrates that the contribution of the axial load to the total load is much higher than that of the radial load.

With increase of transmitted power of multi-megawatt wind turbines and the use of gearing with a big helix angle, bearings are required with high capacity in order to be able to take up the actual loads. A disadvantage of this, however, is that with higher bearing capacity the size of the bearings increases and the very important limiting or maximum speed of the bearing decreases.

Lots of wind turbines have generators running with 1500 up to 2000 rpm what is their maximum speed and therefore the nominal speed of the gearbox shaft. While having combined forces out of radial and axial loads, the resulting load can be higher than the radial load. In these cases, no suitable roller bearings can be found to take up the loads under the required speed.

SUMMARY OF THE INVENTION

It is an object of embodiments of the present invention to provide a parallel gear unit for a gearbox in a multi-megawatt wind turbine, a gearbox comprising such parallel gear unit and a multi-megawatt wind turbine comprising a gearbox comprising such parallel gear unit.

The above objective is accomplished by a method and device according to embodiments of the present invention.

Embodiments of the present invention are intended to provide a parallel gear unit for a gearbox for a wind turbine in which the bearings can withstand the axial and radial loads originating from gear toothing and still allows high rotational speed of, for example, between 1500 and 2000 rpm.

In a first aspect, the present invention provides a parallel gear unit for a gearbox for a multi-megawatt wind turbine. With multi-megawatt wind turbine is meant a wind turbine which is able to generate more than 1 megawatt of electricity. The parallel gear unit comprises at least a low speed shaft and a high speed shaft, each shaft comprising a gear with helical teeth, the gears of each shaft being adapted for meshing with each other. In a parallel gear unit according to the present invention, the low speed shaft is rotatably supported by roller bearings and the high speed shaft is rotatably supported by sliding bearings.

In one aspect, the present invention provides a parallel gear unit for a gearbox for a multi-megawatt wind turbine comprising at least two parallel shafts, each shaft comprising a gear with helical teeth, the gears of each shaft being adapted for meshing with each other, and at least one of the shafts being supported by roller bearings and at least one other shaft being supported by sliding bearings.

It has to be understood, as known by a person skilled in the art, that sliding bearings may also be referred to as friction bearings, slide bearings, plain bearings or journal bearings.

According to embodiments of the invention, the parallel gear unit may furthermore comprise an intermediate shaft in between the low speed shaft and the high speed shaft. The intermediate shaft is rotatably supported by roller bearings.

According to further embodiments, the parallel gear unit may furthermore comprise a thrust collar on at least one of the shafts, the thrust collar thereby contacting the gear on a neighbouring shaft. For example, in case of a parallel gear unit comprising a low speed shaft and a high speed shaft, and a thrust collar is provided on the high speed shaft, the thrust collar is contacting the gear on the low speed shaft.

According to embodiments of the invention, the thrust collar may be provided on at least the high speed shaft which is supported by the sliding bearings.

In embodiments of the invention, the thrust collar may be in direct contact with the gear on the neighbouring shaft. With the thrust collar being in direct contact with the gear on the neighbouring shaft is meant that no additional parts are present in between the thrust collar and the gear on the neighbouring shaft.

According to other embodiments of the invention, the thrust collar may be in indirect contact with the gear on the neighbouring shaft. With the thrust collar being in indirect contact with the gear on the neighbouring shaft is meant that an additional part, e.g. wearring, may be present in between the thrust collar and the gear on the neighbouring shaft.

The thrust collar may have a contact diameter of between $0.8 \times d_0$ and $1.4 \times d_0$ and a width of between $0.1 \times d_0$ and $0.3 \times d_0$, with $$d_0 = z \cdot m_n, \quad (2)$$

wherein z is the number of teeth and $m_n$ the normal module.

The thrust collar chamfer may be between 0° and 15°, for example between 0.5° and 5° or between 0.5° and 2.5°, and may for example be 1°.

The roller bearings may be selected from the list comprising taper roller bearings, cylindrical roller bearings, spherical roller bearings or CARB toroidal roller bearings. When the parallel gear unit comprises a low speed shaft, an intermediate shaft and a high speed shaft, according to embodiments of the invention, each of the intermediate and low speed shafts are supported by roller bearings. According to embodiments of the invention, different roller bearings may be selected for the intermediate and low speed shaft. According to other embodiments of the invention, same roller bearings may be selected for the intermediate and low speed shaft.

In a further aspect of the invention, a gearbox for a wind turbine is provided. The gearbox comprises a parallel gear unit with at least a low speed shaft and a high speed shaft, each shaft comprising a gear with helical teeth, the gears of each shaft being adapted for meshing with each other, wherein the low speed shaft is rotatably supported by roller bearings and the high speed shaft is rotatably supported by sliding bearings.

The parallel gear unit may furthermore comprise an intermediate shaft in between the low speed shaft and the high speed shaft, the intermediate shaft being supported by roller bearings.

According to advantageous embodiments, the parallel gear unit in the gearbox may furthermore comprise a thrust collar on at least one of the shafts.

According to specific embodiments, the thrust collar may be provided on at least the high speed shaft which is supported by the sliding bearings.

In still a further aspect of the invention, a wind turbine is provided comprising a gearbox according to embodiments of the invention. The wind turbine may be a multi-megawatt wind turbine. With multi-megawatt wind turbine is meant a wind turbine which is able to generate more than 1 megawatt of electricity.

The wind turbine comprises a gearbox comprising at least one planetary gear unit and a parallel gear unit, the parallel gear unit comprising at least a low speed shaft and a high speed shaft, each shaft comprising a gear with helical teeth, the gears of each shaft being adapted for meshing with each other, wherein the low speed shaft is rotatably supported by roller bearings and the high speed shaft is rotatably supported by sliding bearings The above and other characteristics, features and advantages of the present invention will become apparent from the following detailed description, taken in conjunction with the accompanying drawings, which illustrate, by way of example, the principles of the invention.

BRIEF DESCRIPTION OF THE DRAWINGS

Same reference signs in the different figures refer to same or analogous elements.

DESCRIPTION OF ILLUSTRATIVE EMBODIMENTS

The present invention will be described with respect to particular embodiments and with reference to certain non-limiting drawings. It has to be understood that the invention is not limited thereto but is only limited by the claims. For illustrative purposes, the size of some of the elements in the drawings may be exaggerated and not drawn on scale.

Terms such as "comprising" and "coupled" are not to be interpreted as limiting the invention in any way. The term "comprising", used in the claims, should not be interpreted as being restricted to the means listed thereafter; it does not exclude other elements or steps. Similarly, it is to be noticed that the term "coupled", also used in the claims, should not be interpreted as being restricted to direct connections only.

While some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Hereinafter, the present invention will be described by means of different embodiments. It has to be understood that these embodiments are only for the ease of understanding the invention and are not intended to limit the invention in any way.

The present invention provides a parallel gear unit for a gearbox in a multi-megawatt wind turbine, a gearbox comprising such a parallel gear unit and a multi-megawatt wind turbine comprising such a gearbox. With multi-megawatt wind turbine is meant a wind turbine which is able to generate more than 1 megawatt of electricity.

It was already described earlier that, during operation, wind turbines, and especially multi-megawatt wind turbines, create high dynamic forces to and speed variations in the gearbox during operation. This dynamic behaviour can lead to bearing damages and consequently to bearing failures. One of the possible causes of bearing failure could be axial movement of the rollers in the bearings due to axial forces and the dynamics of these axial forces. Hence, on top of the radial load acting on the bearings, these axial forces may induce axial vibration of the bearings.

Furthermore, noise behaviour is identified as an important parameter in the design of multi-megawatt wind turbine gearboxes. For optimising noise behaviour, parallel gear units of gearboxes are designed to have helical toothing with a big helix angle. Such big helix angles lead to the creation of high radial and axial loads. For taking up the actual loads in such multi-megawatt wind turbine gearboxes bearings with high capacity are required. However, for higher bearing capacity, the size of the bearings increases and the limiting or maximum speed of the bearings decreases.

For multi-megawatt wind-turbines, available roller bearings for use in parallel gear units of a gearbox may not be able to take up combined loads from axial and radial forces, through which additional axial bearings may be required for compensating for the axial forces which originate from helical teeth of the gears. Furthermore, even if such available roller bearings would be able to partly or fully take up the axial and radial forces, they cannot do this at the required high rotational speeds of for example between 1500 rpm and 2000 rpm.

Therefore, the present invention teaches the use of suitable bearing arrangements for rotatably supporting shafts of the parallel gear unit.

In one aspect, the present invention provides a parallel gear unit for a gearbox for a multi-megawatt wind turbine. With multi-megawatt wind turbine is meant a wind turbine which is able to generate more than 1 megawatt of electricity. The parallel gear unit comprises at least a low speed shaft and a high speed shaft, each shaft comprising a gear with helical teeth, the gears of each shaft being adapted for meshing with each other. The low speed shaft is rotatably supported by roller bearings and the high speed shaft is rotatably supported by sliding bearings.

It has to be understood, as known by a person skilled in the art, that sliding bearings may also be referred to as friction bearings, slide bearings, plain bearings or journal bearings.

In a parallel gear unit according to embodiments of the invention, the bearing arrangements on the shafts can withstand the load created during operation of the gearbox while still allowing high rotational speeds of, for example, between 1500 rpm and 2000 rpm.

Figure 4:
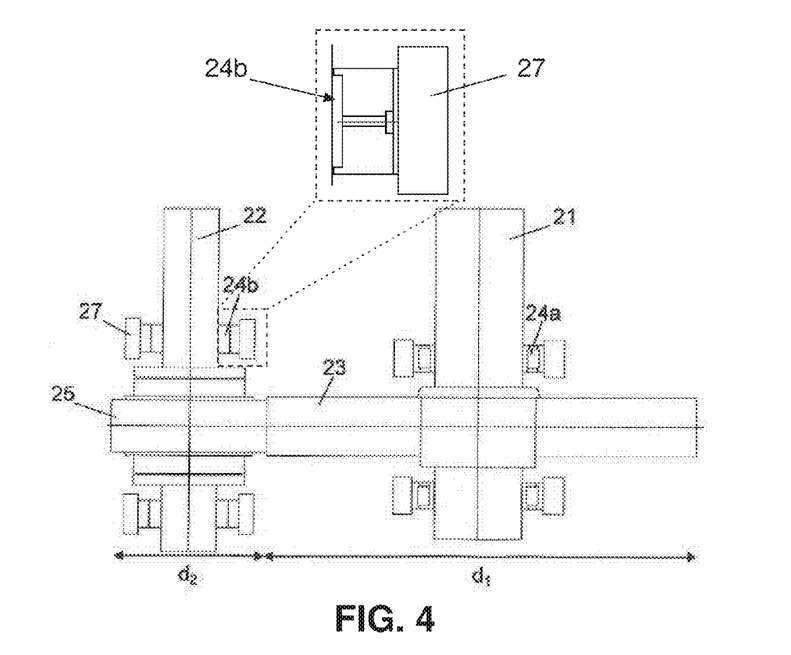
FIG. 4 and FIG. 5 illustrate a parallel gear unit according to embodiments of the present invention.

FIG. 4 illustrates part of a parallel gear unit 20 according to embodiments of the present invention. In the example given, the parallel gear unit 20 comprises a first shaft 21 and a second shaft 22 which are parallel to each other. As already described above, a parallel gear unit 20 of a gearbox may comprise a low speed shaft, an intermediate shaft and a high speed shaft in case of a two-stage parallel gear unit or may comprise a low speed shaft and a high speed shaft in case of a one-stage parallel gear unit. For example, with reference to FIG. 4, the first shaft 21 may be the low speed shaft of the parallel gear unit 20 and the second shaft 22 may be the high speed shaft of the parallel gear unit 20. Or the first shaft 21 may be the intermediate shaft of the parallel gear unit 20 and the second shaft 22 may be the high speed shaft of the parallel gear unit 20.

It has to be noted that, as known by a person skilled in the art, the low speed shaft may also be referred to as low speed intermediate shaft and the intermediate shaft may also be referred to as high speed intermediate shaft.

Hereinafter, the present invention will further be described by means of the first shaft 21 being the low speed shaft and the second shaft 22 being the high speed shaft. It has to be understood that this is only for the ease of explanation and is not intended to limit the invention in any way. The first shaft 21 may, according to other embodiments of the invention where the parallel gear unit 20 is a two-stage parallel gear unit, also be the intermediate shaft.

In the examples given in FIG. 4, the low speed shaft 21 is coupled to a first gear 23 and is rotatably supported by roller bearings 24a. The first gear 23 may also be referred to as gear wheel, and more particular as low speed gear wheel. The gear 23 has helical teeth and has a diameter $d_1$. The high speed shaft 22 is coupled to a second gear 25, which may also be referred to as pinion, and is supported by sliding bearings 24b. The second gear or pinion 25 also has helical teeth. The second gear 25 meshes with the first gear 23 and has a diameter $d_2$ which is smaller than the diameter $d_1$ of the first gear 23.

In the drawings, the sliding bearings 24b are, for the ease of illustration, drawn as two rectangles. It has to be understood that the sliding bearings 24b may also be drawn in more detail as is illustrated in the insert of FIG. 4.

The roller bearings 24a may be any kind of roller bearings 24a known by a person skilled in the art such as, for example, tapered roller bearings, cylindrical roller bearings, spherical roller bearings or CARB toroidal roller bearings (see further). In FIG. 4 the roller bearings 24a supporting the low speed shaft 21 are cylindrical roller bearings located in O position.

In case the parallel gear unit 20 comprises a low speed shaft 21, a high speed shaft 22 and an intermediate shaft, both the low speed shaft 21 and the intermediate shaft are, according to embodiments of the present invention, rotatably supported by roller bearings 24a, while the high speed shaft 22 is rotatably supported by sliding bearings. In that case, according to embodiments of the invention, the roller bearings 24a supporting the low speed shaft 21 may be of a same type as the roller bearings 24a supporting the intermediate shaft. According to further embodiments, the roller bearings 24a supporting the low speed shaft 21 may be of a different type than the roller bearings 24a supporting the intermediate shaft.

In the figures, reference number 27 schematically illustrates the housing of the gearbox.

Figure 5:
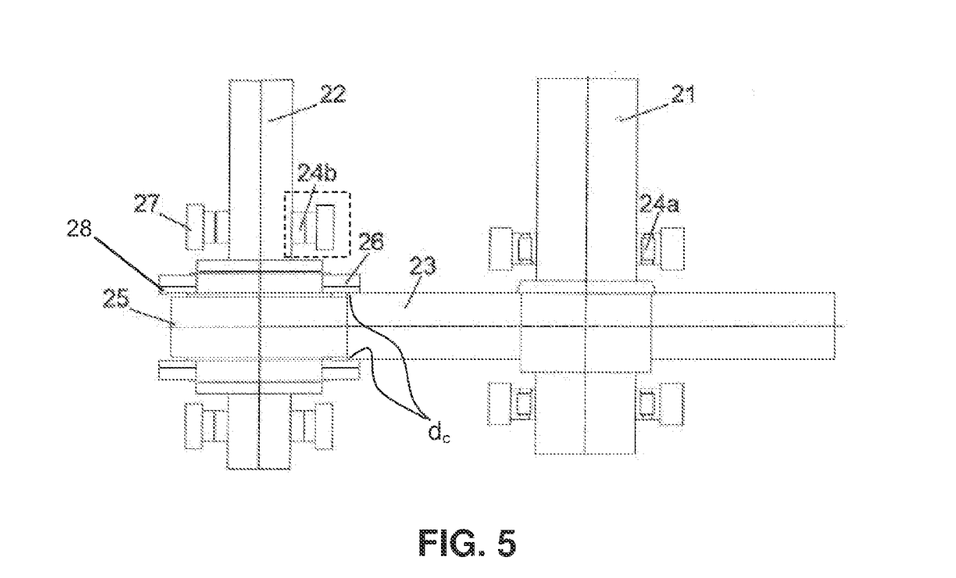

According to embodiments of the invention, the parallel gear unit 20 may furthermore comprise a thrust collar 26. The thrust collar 26 may be provided on at least one of the low speed shaft 22, the intermediate shaft or high speed shaft 21. FIG. 5 illustrates a parallel gear unit 20 according to such embodiments. In this example a thrust collar 26 is provided on the high speed shaft 21 which is supported by the sliding bearings 24b and comprises the gear 25 with diameter $d_2$ smaller than diameter $d_1$ of the gear wheel 23. However, according to other embodiments of the invention, the thrust collar 26 may also be provided on the low speed shaft 21 supported by the roller bearings 24a and comprising the gear 23 with diameter $d_1$ which is higher than diameter $d_2$ of the pinion 25 (see further).

A combination of suitable bearing arrangements and the use of a thrust collar on at least one shaft, for example the high speed shaft, of the parallel gear unit 20 as described above provides suitable uptake of axial and radial loads originating from gear toothing while still allowing high rotational speeds of, for example, between 1500 rpm and 2000 rpm.

An advantage of the present embodiment is that additional axial bearings on each shaft are not necessary because axial forces resulting of the helical teeth of the gears are directly taken by the thrust collar. Hence, the roller bearings 24a and the sliding bearings 24b respectively supporting shafts 21 and 22 do not suffer from high axial forces or at least will suffer less from such axial forces than prior art bearings do. Consequently, the roller bearings 24a and the sliding bearings 24b may have longer life times.

Another effect of providing a thrust collar according to embodiments of the invention is a reduction of the normally severe axial loads in the housing because axial forces are taken up in a small loop within the gears. This will offer the possibility to use light materials or thinner wall thicknesses in the design of the housings of the gearbox.

Figure 6:
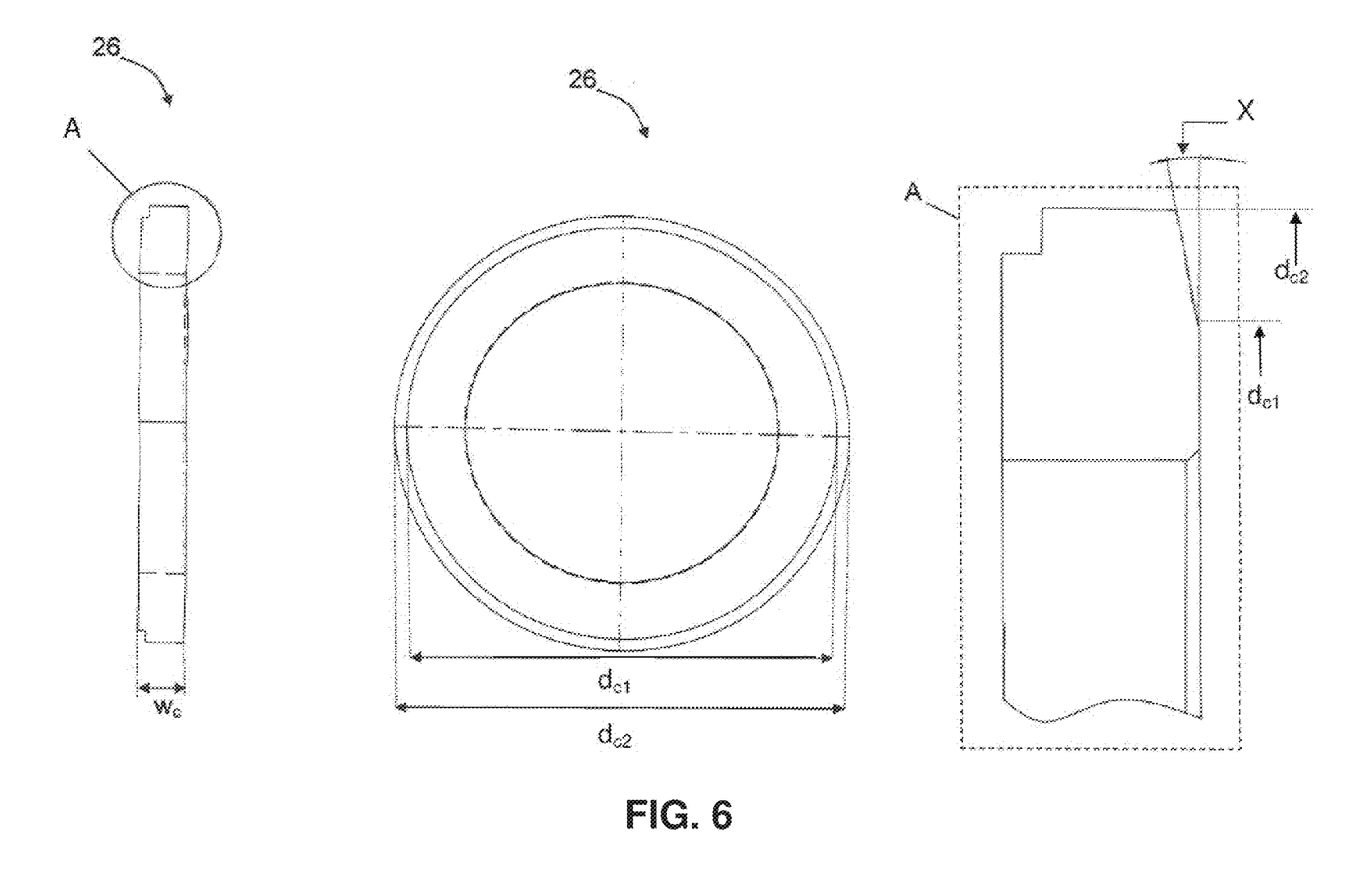
FIG. 6 illustrates a thrust collar that can be used with a parallel gear unit according to embodiments of the invention.

FIG. 6 illustrates an example of a thrust collar 26 that can be used in a parallel gear unit 20 according to embodiments of the invention. It has to be understood that this is only an example and is not intended to limit the invention in any way. The drawing at the left of FIG. 6 shows a side view and the drawing in the middle of FIG. 6 shows a top view of such thrust collar 26. The thrust collar 26 may have a contact diameter $d_c$ (see FIG. 5) of between $0.8 \times d_0$ and $1.4 \times d_0$ and a width $w_c$ of between $0.1 \times d_0$ and $0.3 \times d_0$, with $$d_0 = z \cdot m_n,$$

wherein z is the number of teeth and $m_n$ the normal module.

The right drawing of FIG. 6 illustrates part A as indicated in the left drawing of FIG. 6. From this right drawing it can be seen that the thrust collar 26 comprises a thrust collar chamfer X. The thrust collar chamfer X may be between 0° and 15°, for example between 0.5° and 5° or between 0.5° and 2.5°, and may for example be 1°. Because of the existence of the thrust collar chamfer X, the thrust collar 26 may have a first contact diameter $d_{c1}$ and a second contact diameter $d_{c2}$ by which $d_{c1}$ is smaller than $d_{c2}$. The difference between $d_{c1}$ and $d_{c2}$ is determined by the size of the thrust collar chamfer X.

In the embodiment illustrated in FIG. 5, the thrust collar 26 is provided in direct contact with the gear of the neighbouring shaft, in the example given gear wheel 23. With the thrust collar 26 being in direct contact with the gear wheel 23 is meant that no other parts are present in between the thrust collar 26 and the gear wheel 23.

However, according to other embodiments of the invention, the thrust collar 26 may be provided in indirect contact with the gear wheel 23. With the thrust collar 26 being in indirect contact with the gear wheel 23 is meant that there is an additional part, such as for example a wearring, present in between the thrust collar 26 and the gear wheel 23. According to embodiments of the invention, the wearring 28 may, for example, have an outer diameter $D_w$ of between $0.8 \times d_0$ and $1.4 \times d_0$, with $$d_0 = z \cdot m_n,$$

wherein z is the number of teeth and $m_n$ the normal module.

Hereinafter, some examples of implementations of parallel gear units 20 according to embodiments of the invention will be described. It has to be understood that this is only by way of an example and for the purpose of illustration and is not intended to limit the invention in any way.

Figure 7:
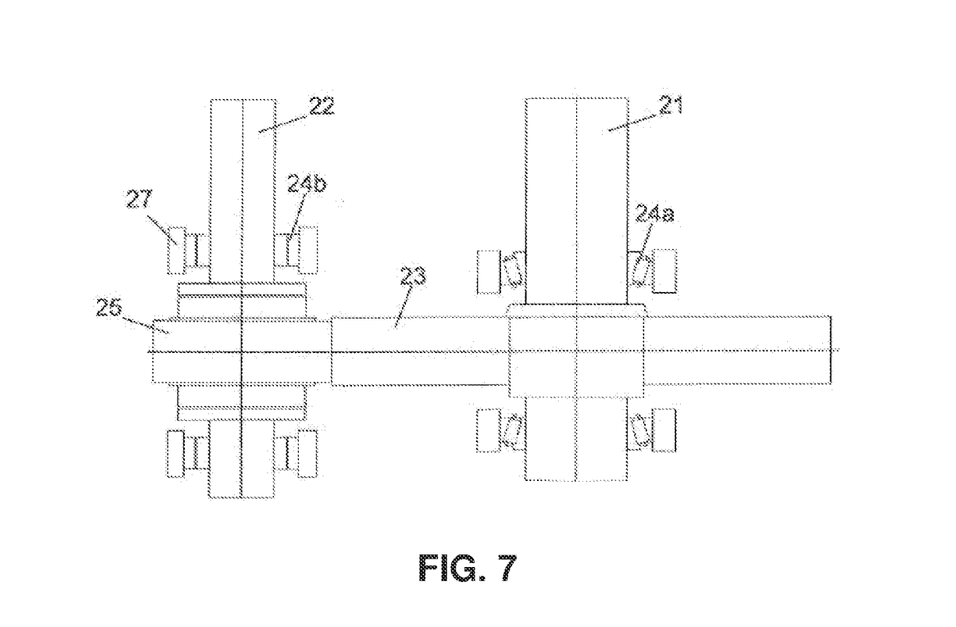
FIG. 7 to FIG. 11 illustrate parallel gear units according to embodiments of the present invention.

In FIG. 7 the low speed shaft 21 is supported by taper roller bearings 24a and the speed high shaft 22 is supported by sliding bearings 24b. No thrust cam 26 is present.

Figure 8:
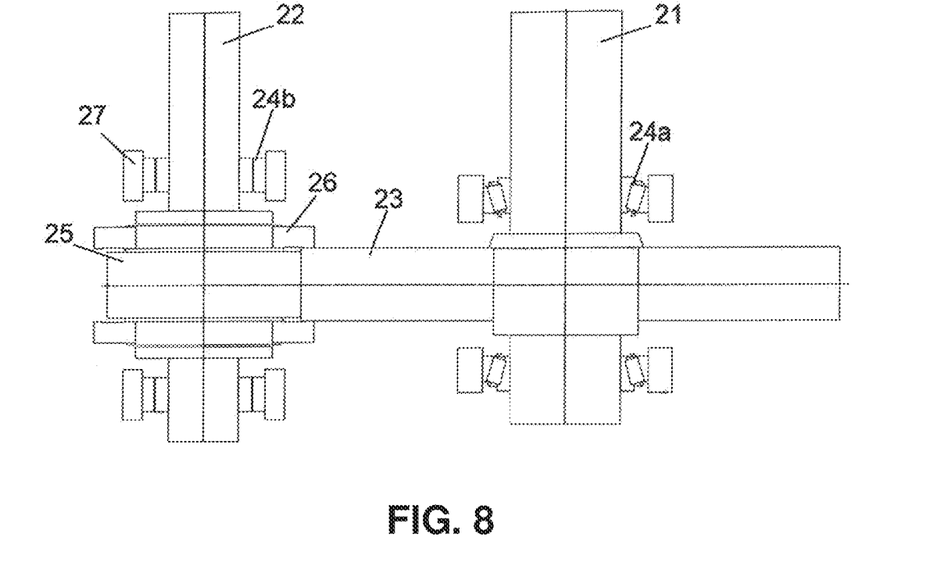

FIG. 8 illustrates a similar implementation as in FIG. 7. The low speed shaft 21 is supported by taper roller bearings 24a and the high speed shaft 22 is supported by sliding bearings 24b. The difference between the present example and the example in FIG. 7 is that in the present example a thrust collar 26 is provided on the high speed shaft 22. The thrust collar 26 is in direct contact with the gear wheel 23. In this example, the taper roller bearings 24a are located in X position.

Figure 9:
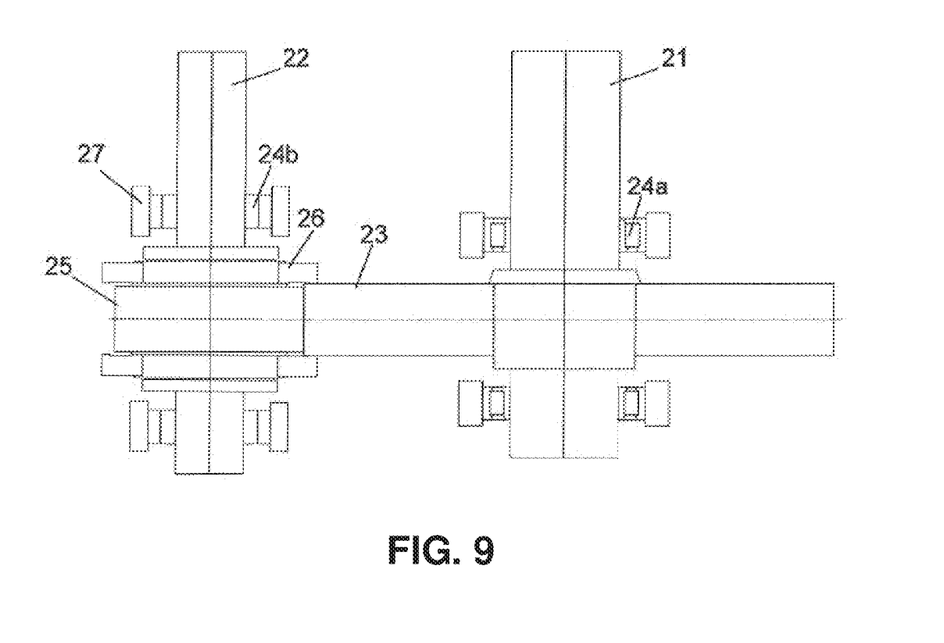

In FIG. 9 the low speed shaft 21 is supported by cylindrical roller bearings 24a and the high speed shaft 22 is supported by sliding bearings 24b. In the present example, the cylindrical roller bearings 24a on the low speed shaft 21 are provided in an X-configuration. A thrust collar 26 is provided on the high speed shaft 22. The thrust collar 26 is in direct contact with the gear wheel 23.

Figure 10:
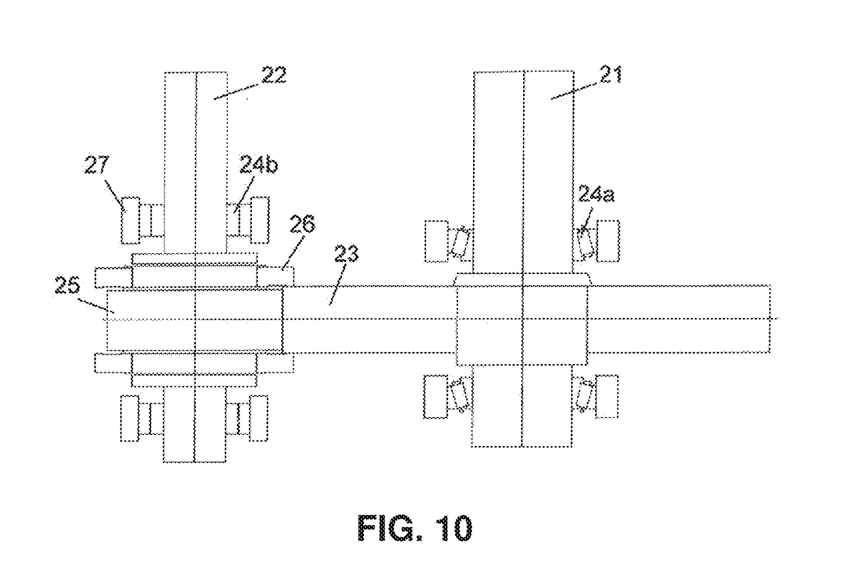

In FIG. 10 the low speed shaft 21 is supported by taper roller bearings 24a and the high speed shaft 22 is supported by sliding bearings 24b. The difference with FIG. 8 is that in the present example the taper roller bearings 24a are located in O position. A thrust collar 26 is provided on the high speed shaft 21. The thrust collar 26 is in direct contact with the pinion 25.

Figure 11:
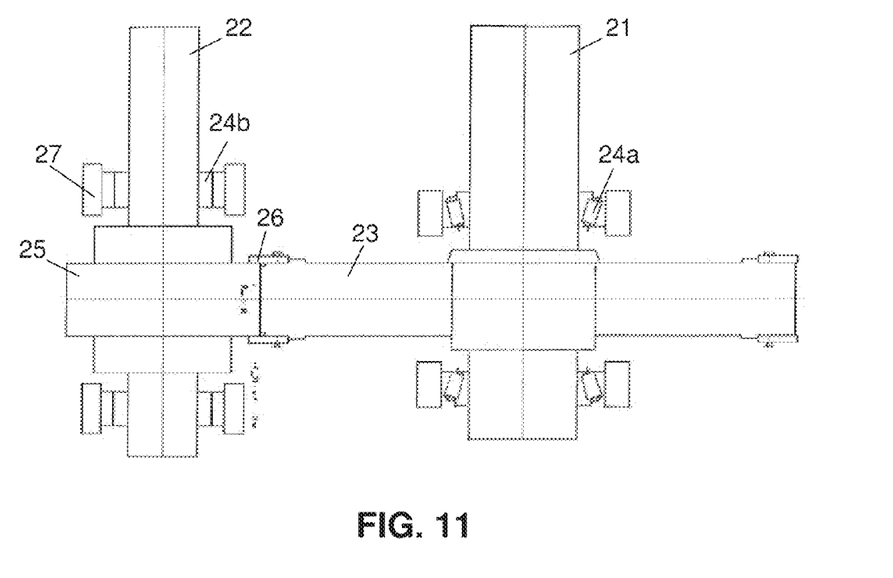

In FIG. 11 the low speed shaft 21 is, similar to FIG. 8, supported by taper roller bearings 24a in X position and the high speed shaft 22 is supported by sliding bearings 24b. A thrust collar 26 is provided on the low speed shaft 21. The thrust collar 26 is in direct contact with the pinion 25.

It has to be understood that in the above examples, the low speed shaft 21 may be supported by any type of roller bearings 24a as described above. Furthermore, any combination of roller bearings 24a on the low speed shaft 21 and sliding bearings 24b on the high speed shaft 22 can be combined with a thrust collar 26 provided on the gear 23 on the low speed shaft 21 or with a thrust collar 26 provided on the gear 25 on the high speed shaft 22. Moreover, any such combination can be combined with the optional presence of a wearring 28 in between the gear 23, 25 and the thrust collar 26.

It has furthermore to be understood that in the above examples, the first shaft was referred to as low speed shaft 21. As already mentioned before, according to embodiments of the invention the first shaft 21 may also be implemented as the intermediate shaft of the parallel gear unit 20.

In a second aspect, the present invention provides a gearbox 30 for a multi-megawatt wind turbine. The gearbox 30 comprises at least one planetary gear unit 31 and a parallel gear unit 20. The parallel gear unit 20 comprises at least a low speed shaft 21 and a high speed shaft 22, each shaft 21, 22 comprising a gear 23, 25 with helical teeth, the gears 23, 25 of each shaft 21, 22 being adapted for meshing with each other. The low speed shaft 21 is rotatably supported by roller bearings 24a and the high speed shaft 22 is rotatably supported by sliding bearings 24b. The parallel gear unit 20 in the gearbox 30 according to embodiments of the invention can be implemented in all ways that have been described above with respect to the first aspect of the invention.

Figure 12:
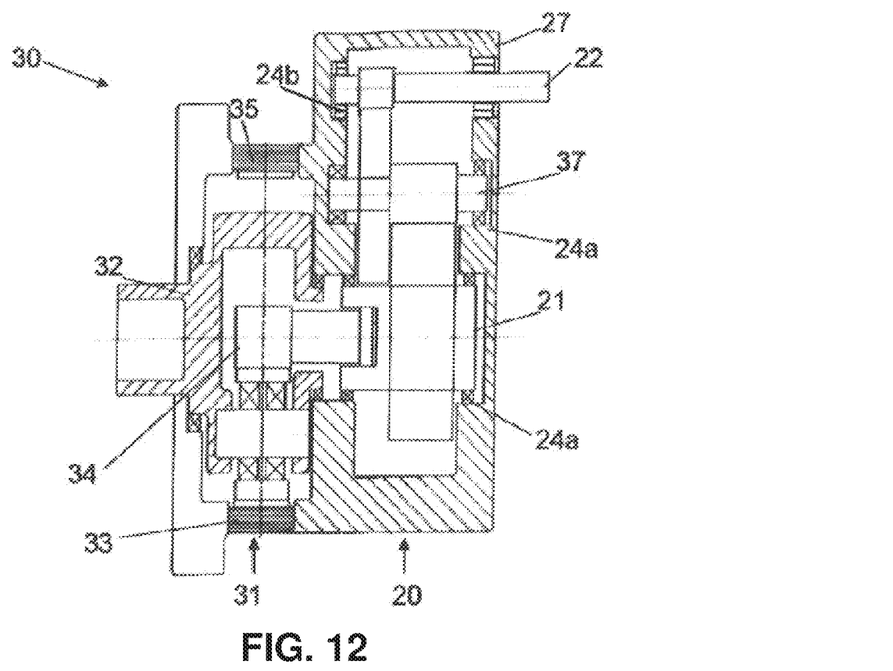
FIGS. 12 to 14 illustrate a gearboxes according to embodiments of the present invention.

FIG. 12 illustrates a gearbox 30 according to a first embodiment of the second aspect of the present invention. The gearbox 30 comprises a housing 27, one planetary gear unit 31 and a two-stage parallel gear unit 20. The planetary gear unit 31 comprises a planet carrier 32 supporting a plurality of planet gears 33. The planet gears 33 mesh with a sun gear 34 and a ring gear 35. According to the first embodiment, the two-stage parallel gear unit 20 comprises a low speed shaft 21, an intermediate shaft 36 and a high speed shaft 22. The low speed shaft 21 and the intermediate shaft 36 are rotatably supported by roller bearing 24a. The high speed shaft 22 is rotatably supported by sliding bearings 24b.

Figure 13:
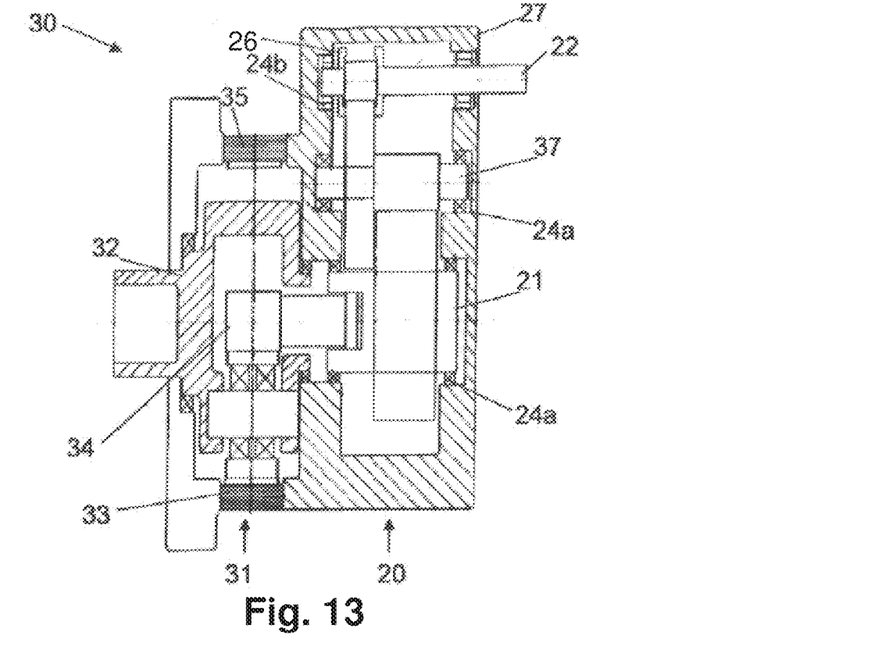

According to embodiments of the invention, a thrust collar 26 may be provided on at least one of the shafts 21, 22, 36 of the parallel gear unit 20. FIG. 13 illustrates an example of a gearbox 30 in which in the parallel gear unit 20 a thrust collar 26 is provided on the high speed shaft 22.

According to still further embodiments of the invention, a wearring 28 could be present in between the thrust collar 26 and the gear 23, 25 of the neighbouring shaft.

Furthermore, the parallel gear unit 20 in the gearbox 30 illustrated in FIG. 12 or FIG. 13 may be any parallel gear unit 20 as described in the embodiments of the first aspect of this invention.

Figure 14:
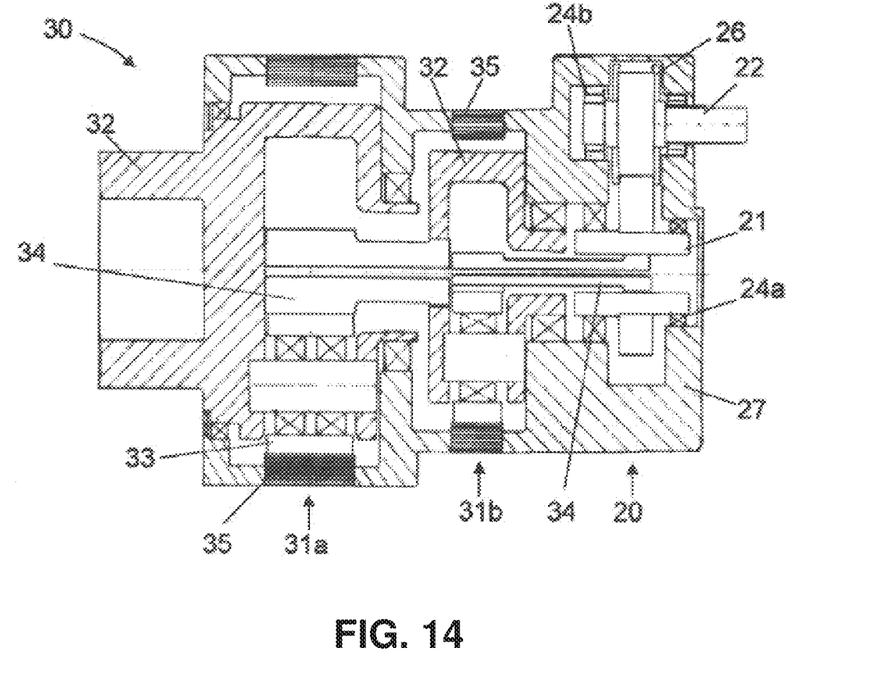

FIG. 14 Illustrates a gearbox 30 according to a second embodiment of the second aspect of the present invention. The gearbox 30 comprises two planetary gear units 31a and 31b and a one-stage parallel gear unit 20. Each of the planetary gear units 31a, 31b comprises the same parts as described for the planetary gear unit 31 in the first embodiment. The parallel gear unit 20 comprises a low speed shaft 21 and a high speed shaft 22. The low speed shaft 21 is rotatably supported by roller bearings 24a and the high speed shaft 22 is rotatably supported by sliding bearings 24b.

A thrust collar 26 is provided on the high speed shaft 22. According to other embodiments, however, the thrust collar 26 could also be provided on the low speed shaft 21. According to further embodiments of the invention, the thrust collar 26 may be left out. Or, to still further embodiments, a wearring 28 could be present in between the thrust collar 26 and the gear 23, 25 of the neighbouring shaft.

Again, it has to be understood that the parallel gear unit 20 in the gearbox 30 illustrated in FIG. 14 may be any parallel gear unit 20 as described in the embodiments of the first aspect of this invention.

In a third aspect, the present invention also provides a wind turbine comprising a gearbox 30 according to embodiments of the invention. Preferably, the wind turbine may be a multi-megawatt wind turbine. With multi-megawatt wind turbine is meant a wind turbine which is able to generate more than 1 megawatt of electricity. The gearbox 30 may comprise at least one planetary gear unit 31 and a parallel gear unit 20. The parallel gear unit 20 comprises at least a low speed shaft 21 and a high speed shaft 22, each shaft 21, 22 comprising a gear 23, 25 with helical teeth, the gears 23, 25 of each shaft 21, 22 being adapted for meshing with each other. The low speed shaft 21 is rotatably supported by roller bearings 24a and the high speed shaft 22 is rotatably supported by sliding bearings 24b.

It has to be understood that the gearbox 30 in the wind turbine may be any gearbox 30 as described with respect to the second aspect of this invention, comprising a parallel gear unit 20 which may be any parallel gear unit 20 as described in the embodiments of the first aspect of this invention.

The invention claimed is:

1. A parallel gear unit (20) for a gearbox (30) for a wind turbine, the parallel gear unit (20) comprising:
   a low speed shaft (21); and
   a high speed shaft (22),
   each of the low speed shaft and the high speed shaft comprising a gear (23, 25) with helical teeth, the gears (23, 25) being adapted for meshing with each other,
   wherein the low speed shaft (21) is rotatably supported by roller bearings (24a) and the high speed shaft (22) is rotatably supported by sliding bearings (24b),
   wherein the parallel gear unit (20) is configured as a gearbox (30) for a wind turbine with the low speed shaft (21) configured for connection to a wind turbine rotor and the high speed shaft (22) configured as an output shaft for connection to a generator of the wind turbine,
   wherein the gearbox (30) provides only a single gear ratio, and
   wherein the parallel gear unit (20) furthermore comprises a thrust collar (26) on at least one of the shafts (21, 22, 36) and in direct contact with the gear (23 or 25) on the neighbouring shaft.

2. The parallel gear unit according to claim 1, wherein the parallel gear unit (20) furthermore comprises an intermediate shaft (36) in between the low speed shaft (21) and the high speed shaft (22), the intermediate shaft (36) being rotatably supported by roller bearings (24a).

3. The parallel gear unit (20) according to claim 1, wherein the thrust collar (26) is provided on at least the high speed shaft (22) which is supported by the sliding bearings (24b).

4. The parallel gear unit (20) according to claim 1, wherein the roller bearings (24a) are selected from taper roller bearings, cylindrical roller bearings, spherical roller bearings or CARB toroidal roller bearings.

5. A gearbox (30) for a wind turbine, the gearbox comprising:
   a planetary gear unit (31); and
   a parallel gear unit (20),
   wherein the parallel gear unit (20) comprises two parallel shafts (21, 22), each of the parallel shafts (21, 22) comprising a gear (23, 25) with helical teeth, the gears (23, 25) being adapted for meshing with each other,
   wherein a first shaft (21) is supported by roller bearings (24a) and a second shaft (22) is supported by sliding bearings (24b),
   wherein the gearbox (30) is configured for a wind turbine with the low speed shaft (21) configured for connection to a wind turbine rotor and the high speed shaft (22) configured as an output shaft for connection to a generator of the wind turbine,
   wherein the gearbox (30) provides only a single gear ratio, and
   wherein the parallel gear unit (20) furthermore comprises a thrust collar (26) on at least one of the shafts (21, 22) and in direct contact with the gear (23 or 25) on the neighbouring shaft.

6. The gearbox (30) according to claim 5, wherein the parallel gear unit (20) furthermore comprises an intermediate shaft (36) in between the low speed shaft (21) and the high speed shaft (22), the intermediate shaft (36) being supported by roller bearings (24a).

7. A wind turbine comprising a gearbox (30) according to claim 5.

* * * * *